3,483,230
ANTHRAQUINONE VAT DYESTUFFS
Istvan Hari and Max Staeuble, Basel, Switzerland, assignors to Ciba Limited, Basel, Switzerland, a company of Switzerland
No Drawing. Continuation-in-part of application Ser. No. 201,247, June 11, 1962. This application Aug. 8, 1966, Ser. No. 570,704
Int. Cl. C09b 1/36; D06p 3/60
U.S. Cl. 260—368                                    3 Claims

ABSTRACT OF THE DISCLOSURE

Anthraquinone vat dyestuffs consisting of 2 anthraquinone units, and a member selected from the group consisting of the carboxybenzoyl-NH-, the carboxynaphthoyl-NH- and the carboxythenoyl-NH- group bound in 1-position of an anthraquinone unit are particularly suitable for coloring natural or regenerated cellulose giving prints and dyeings of excellent light and wet fastness and good fastness to chlorine and to soda boiling.

---

This is a continuation-in-part of our application No. 201,247, filed June 11, 1962 now U.S. Patent No. 3,304,310.

The present invention provides new anthraquinone vat dyestuffs consisting of 2 anthraquinone units, and a member selected from the group consisting of the carboxybenzoyl-NH-, the carboxynaphthoyl-NH- and the carboxythenoyl-NH- group bound in 1-position of an anthraquinone unit.

The term "vat dyestuffs" includes dyestuffs capable of conversion by reduction into a so-called leuco form or vat which has a better affinity for natural and regenerated cellulose fibers than has the non-reduced form, and which can be reconverted by oxidation into the original chromophoric system.

The invention also provides a process for the manufacture of the aforesaid dyestuffs, wherein (a) a vat dyestuff which contains at least one —$NH_2$ group, and at least 2 anthraquinone units, is mono-acylated at the amino group with an anhydride of a benzene, naphthalene or thiophen-dicarboxylic acid or with a benzene, naphthalene or thiophencarboxylic acid halide containing a carboxylic acid group, or (b) a vat dyestuff which contains at least 2 anthraquinone radicals and, in at least one benzoyl-, naphthoyl- or thenoylamino group, at least one functionally converted carboxylic acid group convertible by hydrolysis into a carboxylic acid group, such as a carboxylic acid ester group, a nitrile group or a carboxylic acid halide group, is subjected to hydrolysis, or (c) aminoanthraquinones which contain benzoyl-NH-, carboxynaphthoyl-NH- or carboxythenoyl-NH- group and an acylatable amino group are linked together by means of a halide or anhydride of an aromatic or heterocyclic polycarboxylic acid, or (d) aminoanthraquinones which contain a carboxbenzoyl - NH-, carboxynaphthoyl - NH- or carboxythenoyl-NH- group and an acylamino group are linked together by a heterocyclic ring, more especially by condensation with a polyhalogenated heterocyclic compound, such as halogen-triazine.

As starting materials for method (a) of the process there are used vattable amines, such as 4-aminoanthraquinone-2:1(N)-acridones, 4:4'- 4:5'- or 5:5'-diamino-1:1'-dianthrimidecarbazole, 4- or 5-amino-1:1'-dianthrimidecarbazole, compounds of the formula

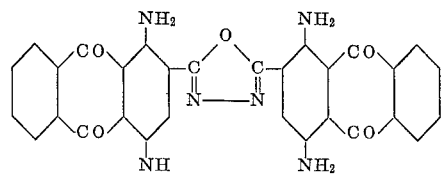

and of the formula

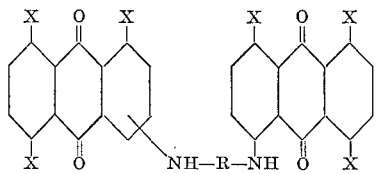

in which at least four of the symbols X represent hydrogen atoms and the remainder represent —$NH_2$ groups, R represents a triazine radical or a —CO—R'—CO— group, in which R' is a heterocyclic or, if desired, aromatic radical which is derived, for example, from a phthalic acid, a naphthalene dicarboxylic acid, a diphenyl dicarboxylic acid, an azobenzene- or azodiphenyl-dicarboxylic acid, a fluoranthene dicarboxylic acid, an anthraquinone dicarboxylic acid, a diphenylsulfone- or diphenylstilbene-dicarboxylic acid, a triazine dicarboxylic acid, quinoline-, thianthrene- or diphenylene-oxide-dicarboxylic acid or a pyrimidine- or thiophene-dicarboxylic acid; and also vat dyestuffs that contain a benzoylamino group, such as amino-benzoylamino-anthrimide-carbazoles, for example, 4 - amino - 5'-benzoylamino-dianthrimide-carbazole or 4-amino-4'-benzoylamino-dianthrimidecarbazole.

As acylating agents that contain at least one carboxyl group there may be used halides of cyclic dicarboxylic acids, such as those of the phthalic acids, naphthalene di- or tetra-carboxylic acids, diphenyl dicarboxylic, diphenylsulfone-dicarboxylic acids, diphenylstilbene-dicarboxylic acids, thiophene dicarboxylic acids, and also halides of the benzoic acids.

The reaction of the vattable amine with the acylating agent may be carried out in an inert organic solvent, for example, nitrobenzene, at a raised temperature. It may also be carried out in a tertiary base, for example, an anhydrous or almost anhydrous pyridine base or in pyridine. The molar ratios of the components are advantageously so chosen that acylaminoderivatives are formed whose acylamino groups contain a carboxylic acid group. When these acylamino-derivatives also contain acylatable amino groups, they may be further reacted with dihalogen-compounds, for example, dihalogen-triazines, dihalogen-pyrimidines or dicarboxylic acid dihalides, to form condensation products that contain two anthraquinone nuclei.

By using as acylating agents carboxylic acid halides that contain, instead of a carboxylic acid group, a functionally converted carboxylic acid group, for example, a nitrile group, a carboxylic acid ester group or a carboxylic acid halide group, there are obtained vat dyestuffs containing carboxylic acid halide groups which can be used as starting materials for method (b) of the process. They can be converted into the vat dyestuffs of the invention by mild hydrolysis, for example, with an alkali metal hydroxide or alkali metal carbonate in an aqueous medium.

As acylatable aminoanthraquinone carboxylic acids used as starting materials for method (c) of the process there may be mentioned, for example, 4- or 5-(2'-, 3'- or 4' - carboxybenzoylamino) - 1 - aminothraquinone. As halides of polycarboxylic acids there are used, for example, the chlorides of 2:5-thiophene dicarboxylic acid of iso- or terephthalic acid, of naphthalene dicarboxylic acids, of diphenyl dicarboxylic acids, of azobenzene- or azodiphenyl-dicarboxylic acids, of fluoroanthene- or anthraquinone-dicarboxylic acids, of diphenyl sulfone- or diphenyl-stilbene-dicarboxylic acids, or triazine dicarboxylic acids or quinoline-, thianthrene- or diphenylene oxide-dicarboxylic acids.

The carboxybenzoylamino-anthraquinone compounds mentioned in the preceding paragraph may also be condensed to form vat dyestuffs of the invention by method (d) of the process, for example, with di- or trichloro-1:3:5-triazines or tetrachloro- or tetrabromo pyrimidines.

In methods (c) and (d) an asymmetrical condensation, for example, with a starting material which contains a carboxylic acid group and a starting material which is free from carboxylic acid group. In this manner there are obtained less hydrophilic, but still valuable vat dyestuffs.

The dyestuffs of the invention are suitable for dyeing or printing a very wide variety of materials, but especially for dyeing or printing textile materials of natural or regenerated cellulose by the usual vat dyeing or printing methods. The dyeings and prints produced therewith are generally fast to chlorine and are distinguished by their excellent fastness to light and excellent properties of wet fastness, especially by their good fastness to soda boiling.

The dyeings produced with the dyestuffs of the invention are fast to dry cleaning and migration. The dyed fabrics can therefore be coated with synthetic resins, for example, polyvinyl chloride, without the dyestuff migrating into the resin, which is particularly important in the manufacture of artificial leather.

As compared with the conventional vat dyestuffs, the vat dyestuffs of the invention have a better levelling and penetrating power. When used for dyeing in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dyestuffs, is omitted in the case of the dyestuffs of the invention.

They can also be used in the form of at least colloidal solutions in the fast-running pad-dyeing processes and, in this case they do not have to be in a finely dispersed commercial form in the form of special pastes, so that the disadvantages of such forms (instability of the paste, dusting, and the need for several operations to prepare finely divided powders) are eliminated. Finally, they can generally be vatted very easily, often at room temperature and, if required with mild reducing agents. They possess a very good solubility in the vat, and yield strong and very level dyeings especially on regenerated cellulose that exhibit the same tint as the corresponding dyeings on cotton.

The following examples illustrate the invention, the parts and percentages being by weight unless otherwise stated, and the relatioinship of parts by weight to parts by volume is the same as that of the kilogram to the liter:

EXAMPLE 1

6 parts of isophthalic acid dichloride are dissolved in 50 parts of dry nitrobenzene. To the solution so obtained are added 3.1 parts of the dyestuff intermediate product of the formula

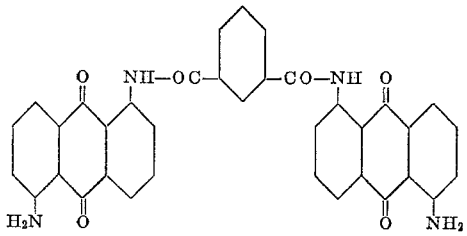

(obtainable by condensing 1 mol of isophthalic acid dichloride with 2 mols of 1-amino-5-nitroanthraquinone and subsequent reduction), and the whole is heated to 130° C., while stirring well, in the presence of 0.2 part of pyridine. The acylation is carried out for 6 hours at 130 to 135° C. and, after cooling the reaction mixture, the reaction product is isolated by filtration. The isolated product is washed successively with nitrobenzene and acetone, and is then reduced at 40 to 50° C. in a solution containing, per liter of water, 8 parts of hydrosulfite and 15 parts of sodium hydroxide solution of 30% strength. The dyestuff of the formula

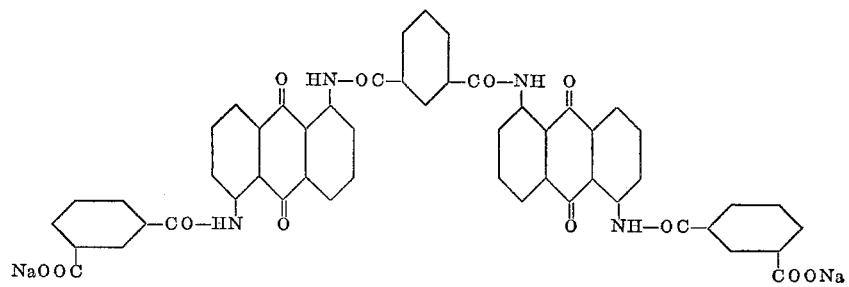

is obtained by blowing air into the reaction mixture, and then isolating the dyestuff by filtration. It is very easily vatted, and dyes cotton and regenerated cellulose yellow tints possessing very good properties of wet fastness and which exhibit very good dyestuff penetration.

Dyeing prescription 0.75 part of the above dyestuff is suspended in 250 parts of water. The dyestuff suspension so obtained is introduced into a solution, having a temperature of 35° C., of 10 parts by volume of aqueous sodium hydroxide solution of 30% strength and 6 parts of sodium hydrosulfite in 1750 parts of water, whereupon vatting takes place instantaneously. In the dyebath so obtained, 50 parts of cotton are dyed for 45 minutes at 30 to 40° C. in the presence of 60 parts of sodium chloride. After the dyeing operation, the dyeing is oxidized, washed, acidified, well rinsed, soaped at the boil, rinsed again, and then dried.

EXAMPLE 2

To a suspension of 1.44 parts of 4:4'-diamino-1:1'-dianthrimide-carbazole in 60 parts of nitrobenzene are added, at 120° C., 1.3 parts of para-carboxybenzoyl chloride [C. S. Marvel, E. A. Kraiman, J. org. chem. 18, 1664 (1953)], the whole is stirred for 30 minutes at 165°

C. and then cooled. The crystalline dyestuff so obtained and having the formula

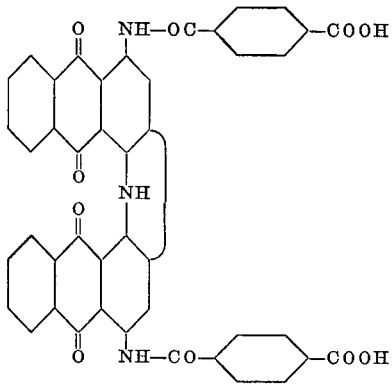

is isolated by suction filtration, washed with hot alcohol, and then dried.

It dyes cotton and regenerated cellulose grey tints possessing excellent properties of wet fastness when applied, for example, according to the dyeing prescription given in the last paragraph of Example 1.

EXAMPLE 3

3.9 parts of 1-amino-5-(4'-carboxbenzoylamino)-anthraquinone are finely suspended in 60 parts of nitrobenzene and 4 parts of diethylaniline. To the suspension so obtained is added, at 120° C., 1.0 part of cyanuric chloride, the whole is stirred for 6 hours at 140° C. and then allowed to cool. The dyestuff of the formula

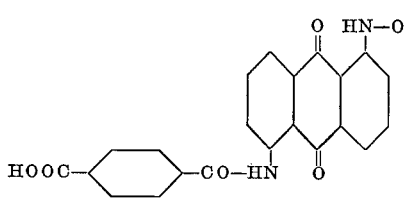

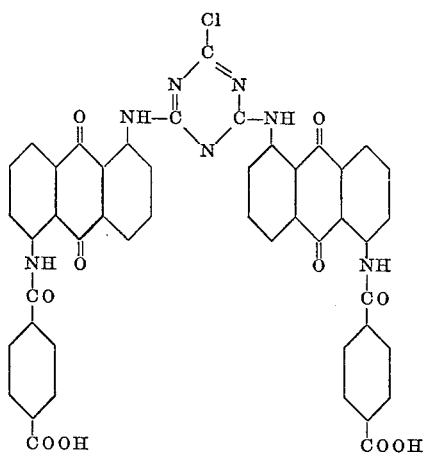

is isolated by suction filtration, washed with ethanol and ether, and then dried.

When applied, for example, by the method given in the last paragraph of Example 1 the dyestuff so obtained dyes cotton and regenerated cellulose yellow tints possessing excellent properties of wet fastness, excellent fastness to light and excellent fastness to solvents.

The amine used as starting material can be prepared as follows:

To a suspension of 6.8 parts of 1-nitro-5-(4'-carboxybenzoylamino)-anthraquinone in 500 parts of water are added, at 60° C., 50 parts by volume of sodium hydroxide solution of 30% strength and 20 parts of sodium hydrosulfits. The vat so formed is filtered hot, cooled, and then oxidized with air. The precipitate is isolated by suction filtration, washed with a small amount of water and then dried. The dark red-brown sodium salt of the amino-carboxylic acid is disoslved in 75 parts of concentrated sulfuric acid, and the resulting pale yellow solution is poured into 300 parts of ice water. The dark red precipitate is isolated by suction filtration, washed until the washings run neutral, and then dried.

EXAMPLE 4

To a fine suspension of 7.32 parts of the compound of the formula

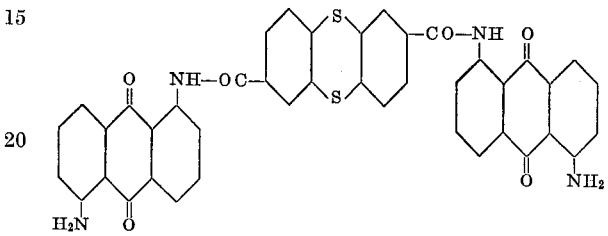

in 150 parts of nitrobenzene are added, at 120° C., 1.85 parts of para-carboxbenzoyl chloride, and the whole is stirred for 30 minutes at 170° C. The isolated dyestuff of the formula

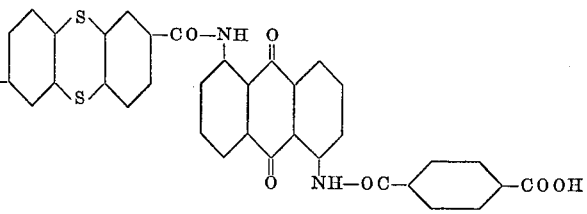

is boiled in ethanol, isolated by suction filtration and dried. When applied by the method described in Example 1 the dyestuff so obtained dyes cotton and regenerated cellulose yellow tints possessing excellent properties of the fastness.

EXAMPLE 5

8 parts of 1:5-naphthalene-dicarboxylic acid dichloride [G. Loch, M. 81, 853 (1950)] are dissolved in 50 parts of dry nitrobenzene at 50° C. To the solution so obtained are added 3.1 parts of the dyestuff intermediate product of the formula

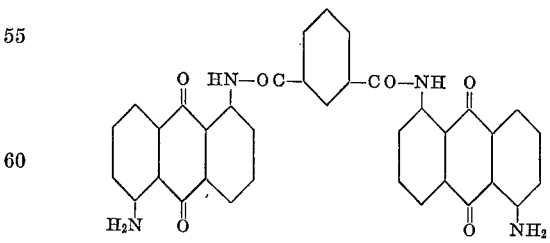

(obtainable by condensing 1 mol of isophthalic acid dichloride with 2 mols of 1-amino-5-nitroanthraquinone and subsequent reduction), and the whole is heated to 130° C., while stirring well, in the presence of 0.2 part of pyridine. The acylation is carried out for 12 hours at 130 to 135° C. and, after cooling the reaction mixture to 50° C., the reaction product is isolated by filtration, The filter residue is washed successively with nitrobenzene and acetone, and then vatted at 40 to 50° C. in a solution containing, per liter of water, 8 parts of hydrosulfite and 15 parts of sodium hydroxide solution of 30% strength. The dyestuff of the formula

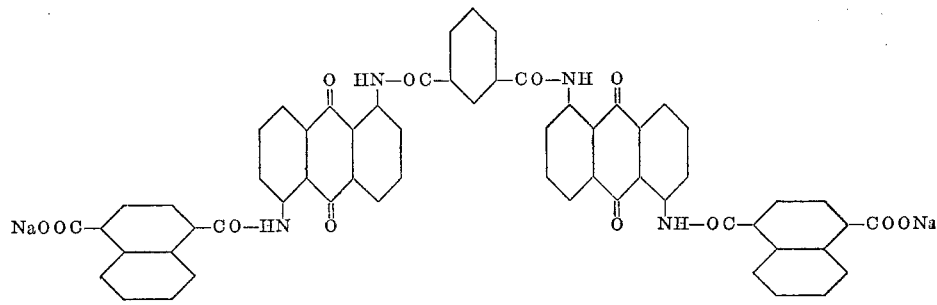

which is recovered from the vat by blowing air into the reaction mixture, and subsequent isolation by filtration, dyes cotton and regenerated cellulose yellow tints possessing very good properties of fastness.

EXAMPLE 6

To a solution of 3.42 parts of 1-amino-5-benzoylaminoanthraquinone in 60 parts of ortho-dichlorobenzene are added, at 120° C., 1.3 parts of 5-carboxy-isophthalic acid chloride, and the whole is stirred at that temperature for 30 minutes and then allowed to cool. The dyestuff of the formula

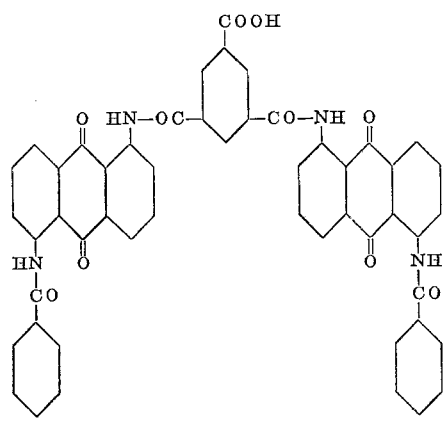

which precipitates, is isolated by suction filtration, boiled in ethanol, again isolated by suction filtration and then dried. It is an orange-yellow powder that dyes cotton and regenerated cellulose very pure, fast tints of high tinctorial strength when applied by the method given in Example 1.

The 5-carboxy-isophthalic acid chloride can be prepared as follows:

To a solution of 9.9 parts of trimesic acid chloride (B.P. 178° C. under a pressure of 10 mm. of mercury) in 70 parts of absolute ether is added 0.75 part of water, and the whole is boiled for 64 hours under reflux. The ether is then distilled off in vacuo. The residue is suspended in a small amount of ligroin, isolated by suction filtration, and then dried. The product so obtained is readily soluble in benzene and melts at 105° C. with decomposition.

EXAMPLE 7

To a fine suspension of 2.28 parts of 4:4'-diamino-1:1'-dianthrimide-carbazole in 60 parts of nitrobenzene are added, at 120° C., 2.0 parts of 2-carboxy-thiophene-5-carboxylic acid chloride and the whole is stirred for 1 hour at 165° C. and then allowed to cool. The isolated dyestuff of the formula

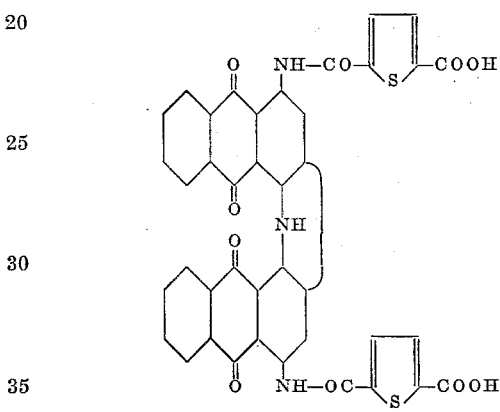

is boiled in ethanol, isolated by suction filtration, and then dried. It is in the form of a black powder that dyes cotton and regenerated cellulose pure olive tints possessing excellent properties of fastness when applied by the dyeing method given in Example 1.

The 2-carboxy-thiophene-5-carboxylic acid chloride can be prepared as follows:

To a solution of 13.9 parts of thiophene-2:5-dicarboxylic acid dichloride (M.P. 44° C.) in 120 parts of absolute ether are added in portions 1.4 parts of water, the whole is boiled for 48 hours under reflux, cooled, and then filtered. The ether is then distilled off in vacuo. The residue is suspended in 30 parts of ligroin and then isolated by suction filtration. The product is obtained is a white powder containing chlorine and melting at 144° C. with decomposition.

EXAMPLE 8

A fine suspension of 1.3 parts of 2:5-bis-(1':4'-diamino-2'-anthraquinonyl)-1:3:4-oxidazole and 1.2 parts of 3:5-dicarboxylbenzoyl chloride in 40 parts of nitrobenzene is heated to 170 to 175° C. in the course of one hour. It is stirred at that temperature for one hour, then 0.5 part by volume of anyhydrous pyridine is added, stirring is continued for 2 hours at 170 to 175° C., and the reaction mixture is then allowed to cool. The isolated dyestuff of the formula

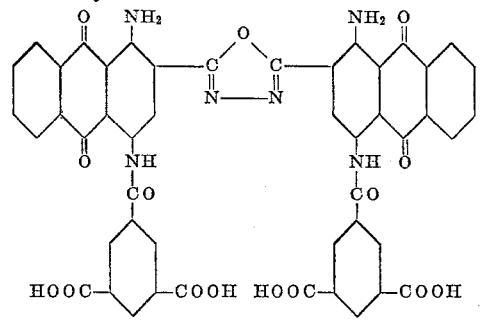

is boiled in ethanol, isolated by suction filtration and then dried. It is in the form of a dark blue powder that dyes cotton and regenerated cellulose pure and fast blue tints of high tinctorial strength when applied by the dyeing prescription given in Example 1.

EXAMPLE 9

5.4 parts of 1-amino-5-nitroanthraquinone are dissolved in 150 parts of dry nitrobenzene at 120° C., and to the solution so obtained are added 4.1 parts of paracarboxybenzoyl chloride. The condensation product precipitates slowly in the form of yellow lamellae. The whole is stirred for 4 hours at 120 to 125° C. and then for 2 hours at 140 to 145° C. After cooling the reaction mixture, the condensation product is isolated by filtration and washed with alcohol. The nitro-dervative so obtained can be reduced to the amine of the formula

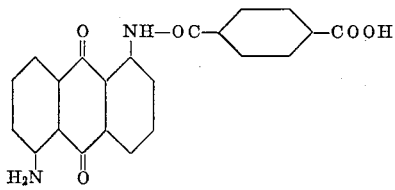

by known methods, for example, by heating it with phenylhydrazine in ortho-dichlorobenzene to 160 to 165° C.

40 parts of benzoic acid-meta-sulfochloride are then converted into the corresponding meta-sulfobenzoic acid dichloride by heating in 100 parts of dry nitrobenzene with 3 parts of thionyl chloride, and the excess of thionyl chloride is distilled off in vacuo. 5.7 parts of the above amine are then added in small portions, and the whole is heated for 4 hours at 120 to 125° C. while stirring, and then for a further 4 hours at 140 to 145° C. To the acylation product so obtained are then added, dropwise, 4 parts of thionyl chloride and 0.1 part of pyridine, the whole is heated for 4 hours at 120 to 130° C., and then 4 parts of 1-amino-5-nitroanthraquinone are added. Condensation is continued for 6 hours at 140 to 145° C., and the resulting intermediate product of the formula

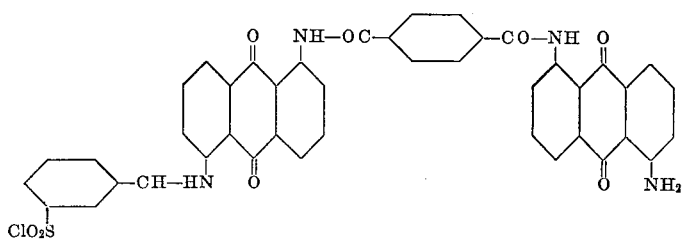

is isolated by filtration. By vatting the product in a solution that contains, per liter, 20 parts by volume of sodium hydroxide of 30% strength and 16 parts of sodium dithionite, and blowing the leuco-compound with air, there is obtained the compound of the formula

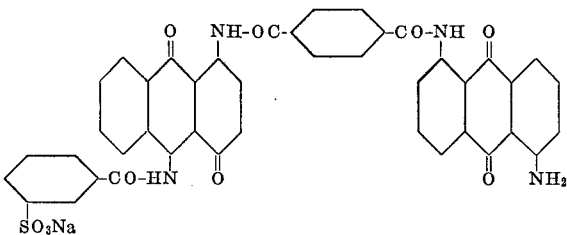

7 parts of the compound so obtained are heated to 90° C. in 100 parts of N-methylpyrrolidone, and 2 parts of paracarboxybenzoyl chloride are then added. Acylation is carried out for 4 hours at 90 to 95° C. and then for 2 hours at 120 to 125° C. After cooling the reaction mixture, it is filtered, the residue is washed with water and, while still moist, is pasted with 6 parts of sulfite cellulose waste liquor in a ball mill. The paste so obtained is dried in vacuo. There is obtained a watersouble dyestuff which, in the form of the free acid, corresponds to the formula

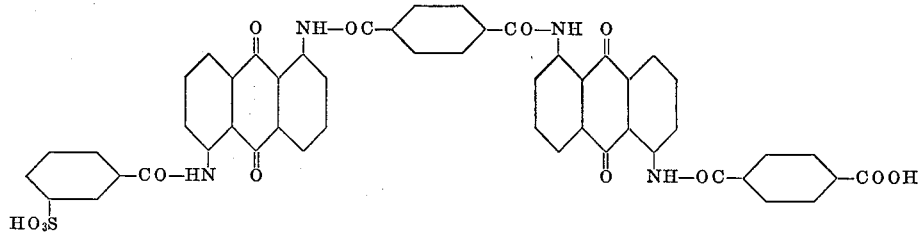

and which dyes cotton from a hydrosulfite vat yellow-brown tints that are fast to washing and soda-boiling.

What is claimed is:

1. An anthraquinone vat dyestuff corresponding to the formula:

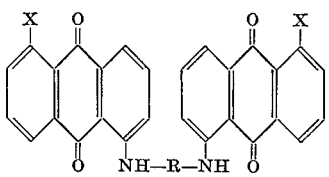

wherein X represents a member of the group consisting of benzoyl-NH—, carboxybenzoyl-NH—, carboxynaphthoyl-NH—, and carboxyethenoyl-NH— and R represents a member of the group consisting of

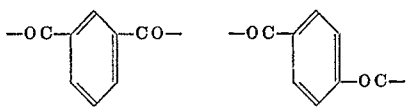

and

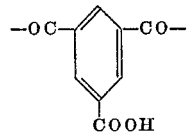

R and Y being chosen so that the dyestuff contains at least one carboxy group.

2. The vat dyestuff of the formula

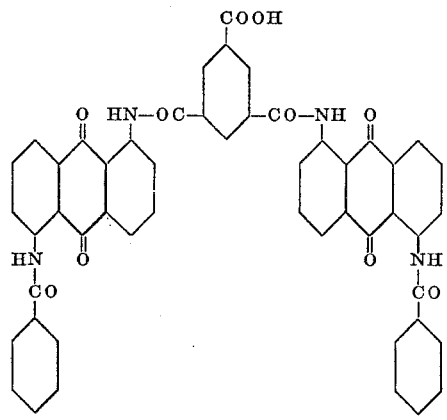

3. The vat dyestuff of the formula

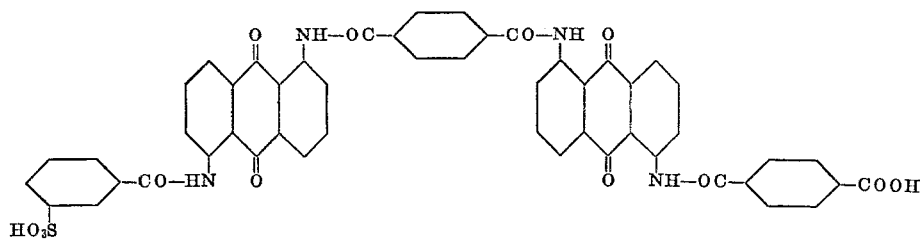

References Cited

UNITED STATES PATENTS

| | | | |
|---|---|---|---|
| 1,667,848 | 5/1928 | Gassner | 260—316 |
| 1,911,714 | 5/1933 | Rosch | 260—368 |
| 2,338,516 | 1/1944 | Kern et al. | 260—327 |
| 2,586,233 | 2/1952 | Kern et al. | 260—316 |
| 2,613,128 | 10/1952 | Baumann et al. | 8—28 |

FOREIGN PATENTS 399,485  7/1924  Germany.

OTHER REFERENCES

Venkataraman: The Chem. of Syn. Dyes, (Academic Press, 1952), pp. 391, 393, 814.

HENRY R. JILES, Primary Examiner

C. M. SHURKO, Assistant Examiner

U.S. Cl. X.R.

8—34, 36, 63, 70; 260—192, 249, 261, 276, 287, 307.5, 316, 327, 329.2, 346.2